D. G. LITTLE ET AL
July 18, 1933. RADIO SIGNALING MEANS Re. 18,895
Original Filed Nov. 22, 1926
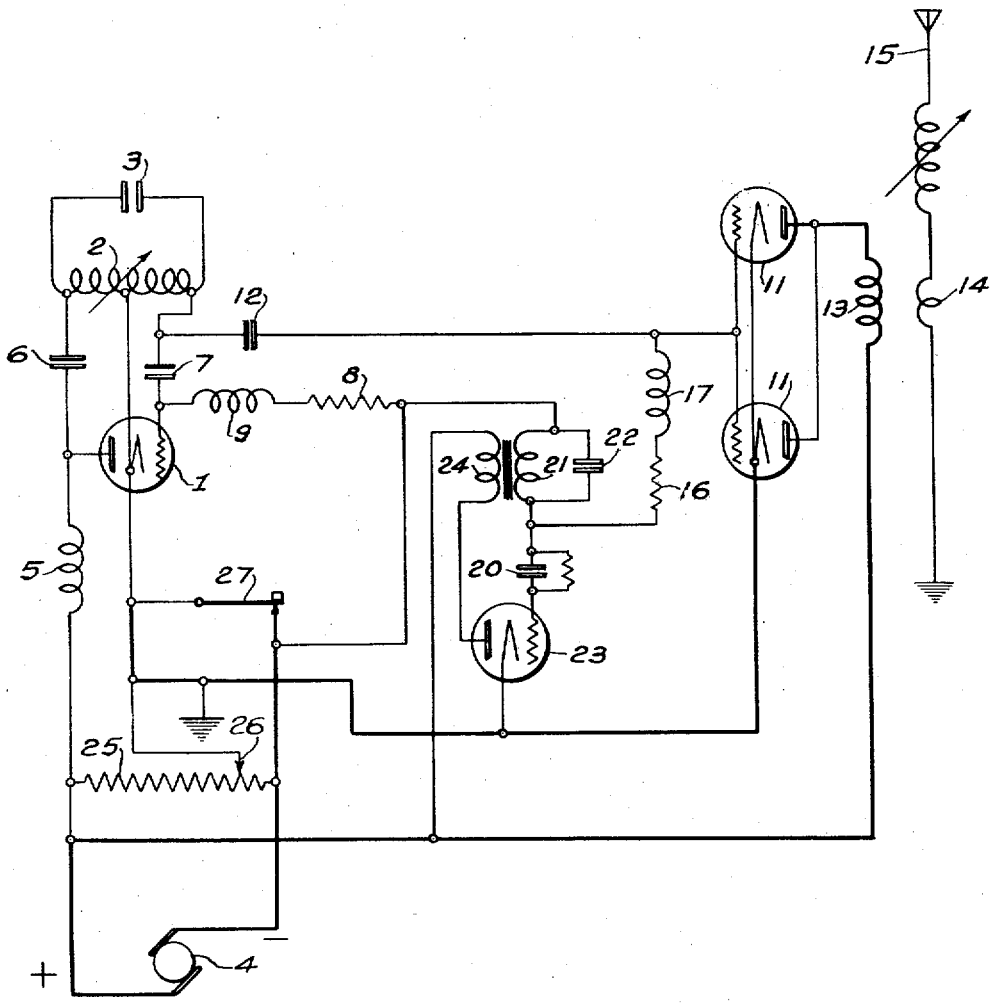
WITNESSES:
E. A. McCloskey.
W. H. Whitten, Jr.
INVENTORS
Donald G. Little &
Nathan C. Defibaugh.
BY
Wesley Sloan
ATTORNEY Reissued July 18, 1933 Re. 18,895

UNITED STATES PATENT OFFICE

DONALD G. LITTLE, OF EAST SPRINGFIELD, AND NATHAN C. DEFIBAUGH, OF LONGMEADOW, MASSACHUSETTS, ASSIGNORS TO WESTINGHOUSE ELECTRIC AND MANUFACTURING COMPANY, A CORPORATION OF PENNSYLVANIA

RADIO SIGNALING MEANS

Original No. 1,707,271, dated April 2, 1929, Serial No. 149,821, filed November 22, 1926. Application for reissue filed May 6, 1930. Serial No. 450,266.

This invention relates to radio-frequency systems of communication and particularly to radio-telegraph systems.

It has been customary, in some radio-telegraph systems, to generate continuous radio-frequency waves and interrupt them at a frequency above the keying frequency. The device used for interrupting the continuous waves, usually called a chopper, includes a mechanical device driven by a motor which requires more power than even a large vacuum tube. Moreover, the chopper is a noisy apparatus which can, and frequently does, disturb the operators at the sending station.

The signal received from a station including a chopper is harsh and unpleasant to listen to. Such a signal cannot be as easily read as one which is a musical note. Experience shows that a signal, so faint that it can hardly be heard, is more often perceived if musical than if harsh.

It is an object of the present invention to produce a device for modulating the radio-frequency waves, which shall produce an audio frequency above the keying frequency. The modulation preferably should be complete, causing no actual interruption but bringing the radio-frequency amplitude to zero, for an instant only, once an audio cycle. The device can, if desired, be adjusted to produce an interruption at each cycle but, if this is done, the note begins to lose its musical character.

It is a further object of our invention to produce a device for modulating the radiated waves which shall be quiet in operation and shall require only a small amount of power.

It is a further object of our invention to produce a device for modulating the radiated waves which shall give a musical note in the receiving instruments.

It is a further object of our invention to produce a device for modulating the radiated waves which shall not cause severe strains in the tubes of the sending system.

It is a further object of our invention to provide a keying system by means of which a blocking potential may be impressed upon the tubes when radiation is to be prevented.

It is a further object of our invention to provide such a keying system in which the blocking potential used shall not much exceed that necessary to prevent the tubes from oscillating.

It is a further object of our invention to provide a keying system in which abrupt stopping and starting of the oscillations in the several tubes are produced without excessive strain upon the tubes.

It is a further object of our invention to provide a blocking potential for the grids, controlled by a key and supplied directly from the generator which energizes the tubes.

Other objects of our invention will be apparent from the following detailed description and the accompanying drawing in which the single figure is a diagram of the circuits and apparatus.

The vacuum tube 1 is connected to an adjustable inductor 2 and a condenser 3 which are associated with it in any known way to constitute an oscillation generator. Energy for the generator is supplied from a high-potential direct-current source 4. An alternating-current source may, if preferred, be utilized but, if so, the tubes fed therefrom will be operative during only a part of the time.

A radio-frequency choke coil 5 protects the source 4 from the oscillations generated at the tube 1, and a condenser 6 prevents a short circuit of the direct current of the source 4. If the source 4 be alternating, the condenser 6 must be small enough to present a large impedance to current therefrom.

The condenser 7 acts as the grid condenser for the tube 1 and is connected, by the usual grid-leak resistor 8, to the negative terminal of the source 4. The connection includes a choke coil 9 which serves to prevent radio-frequency from reaching this source.

The oscillation generator 1 is associated with an amplifier including a plurality of tubes 11, connected in parallel. The output circuit of the generator 1 is connected, through the condenser 12, to the grids of the tube 11. The generator 1, therefore serves as a master oscillator for the plurality of tubes 11. The plate circuit of the tubes 11 contains a primary 13, common to all of these tubes. The plate circuit is supplied from the generator 4, and the primary 13 is associated with a secondary 14 by means of which the antenna 15 is energized.

The grids of the tubes 11 are provided with a grid-leak resistor 16 which is separated from the grids by a radio-frequency choke coil 17. The resistor 16 is connected to the negative terminal of the source 4 and thus to the filaments of the tubes 11.

The connection between the resistor 16 and the negative terminal of the source 4 includes a parallel-resonant circuit comprising an inductor 21 and a condenser 22. The parallel resonant circuit is in the grid circuit of a tube 23 and constitutes a part of the feedback system by means of which the tube 23 is caused to generate oscillations. The inductor 21 is coupled with an inductor 24 in the plate circuit of the tube 23. The inductance 21 and the capacity 22 are of such magnitude that the oscillations generated by the tube 23 are of audio frequency.

There may be provided, instead of the audio-frequency generator 23, a generator of super-audio frequency. Such a generator would require arrangements, not shown herein, for rendering the signal perceptible.

Across the terminals of the generator 4 a potentiometer resistor 25 is connected. The common connection of the filaments of the several tubes to the negative terminal of the generator 4 is over a connection 26, adjustable along said potentiometer. A portion of the resistor 25 is thus included in series between the negative terminal of the generator and the filaments.

A key 27 is connected between the adjustable connection 26 and the negative terminal of the potentiometer. The several grid-leaks are also connected at the negative end of the potentiometer.

In the operation of the device, the oscillation generator 1 produces radio-frequency oscillations from energy supplied by the source 4. The radio-frequency oscillations are impressed over the condenser 12 upon the grids of the plurality of tubes 11. The tubes 11 are supplied with energy from the source 4 which enables them to act as amplifiers controlled by the master oscillator. Radio-frequency oscillations are thus impressed, over the transformer 13—14, upon the antenna 15.

If the potential received by the grids of the tubes 11 were controlled only by the master oscillator, the energy radiated by the antenna would be unmodulated. Unmodulated continuous radiation produces, in the telephones of the receiving sets, only a direct current and, consequently, can not be heard. It has been usual to render the presence of the signal perceptible by interrupting the radiations, but in our invention, the radiations are modulated rather than interrupted. This modulation is produced by a change in potential of the grids of the tubes 11, obtained by superposing an audio-frequency potential from the generator 23 upon the radio-frequency from the master oscillator 1 and the steady potential resulting from the grid-leak connections through the key 27.

As long as the key 27 is closed, radiations are emitted by the antenna 15 and modulated by the oscillator generator 23. The direct-current potential upon the grids of all of the tubes is that determined by the interaction of the several grid condensers 7, 12 and 20 and the respective grid-leaks. The grid potentials, therefore, assume a characteristic average value in each tube respectively.

When the key 27 is opened there is added, to the grid potentials just mentioned, the drop over the portion of the resistor 25 to the right of the contact 26. The contact 26 is so adjusted that the additional negative potential is sufficient to cause each of the tubes to be blocked. Oscillations of all of the tubes, therefore, cease.

It will be observed that the tube 23 does not use energy when it is performing no useful function. It oscillates only when the radiations are being transmitted. It will also be observed that neither the master oscillator nor the amplifiers are consuming energy when the key is open.

At the moment of opening the key 27, the negative potential impressed upon the grid of the tube 1 includes the drop over the arc, which tends to form between the contacts of the key. The grid, therefore, becomes sufficiently negative to render the tube 1 non-conducting. The path over which the arc is supplied thus becomes non-conductive, and the arc is extinguished so promptly that it is not possible to perceive that any arc ever forms. As soon as the arc (which exists only theoretically) is extinguished, the negative potential impressed upon the grid of the tube 1 is only the drop over the right-hand part of the resistor 25. This is sufficient to prevent the tube 1 from oscillating but is not even approximately as great as the whole negative potential of the generator 4. If the whole potential of the generator 4 were impressed upon the grid 1, serious strains would result, and the life of the tube would be materially shortened.

Similar consideration shows that the relation of each of the tubes to the keying device is such as to prevent an arc, and, by the substitution of the potential over a portion of the potentiometer for the whole of the voltage of the generator lessens these strains impressed upon any of the tubes by the keying process.

In an embodiment of our device, actually built, a 50 watt tube has been employed as the tube 23, where, by the methods of the prior art, a chopper driven by a continuously running motor has been employed. In said actual embodiment, the resistor 8 was 5,000 ohms; the resistor 16 was 3,000 ohms; the potential of the source 4 was 1,000 volts, the potentiometer resistor 25 was 40,000 ohms and and the point 26 was so adjusted that the potential drop across the right-hand part of the resistor 25 was some 250 volts.

Although we have specifically described a single embodiment of our invention, it will be readily understood by those skilled in the art that many variations may be made without departing from the spirit of this invention. We, therefore, do not wish to be limited except as indicated in the claims or required by the prior art.

We claim as our invention:

1. In a radio sending system, an antenna, means including a master oscillator and an amplifier for impressing a radio-frequency thereon, a grid-leak circuit including a resistor and a radio-frequency choke coil for said amplifier and means for impressing a periodic audio-frequency potential on said grid-leak circuit.

2. In a radio sending system, a master oscillator, an amplifier controlled thereby, an audio-frequency oscillation generator operatively associated with said amplifier to exert an additional control thereon and key-controlled means for impressing a blocking potential simultaneously on both generators.

3. In a radio sending system, a master oscillator, an amplifier controlled thereby, an audio-frequency oscillation generator operatively associated with said amplifier to exert an additional control thereon and key-controlled means for impressing a blocking potential on said amplifier and simultaneously on both generators.

4. In a radio transmitting system, a master oscillator comprising a triode, an amplifier comprising a triode, an audio-frequency generator comprising a triode, connections whereby said amplifier may be jointly controlled by said master oscillator and said audio-frequency generator; a common source of plate potential for said triodes, and means whereby a blocking potential may be derived from said common source and applied simultaneously to the grids of said triodes.

5. In a radio transmitting system, a master oscillator comprising a triode, an amplifier comprising a triode, an audio frequency generator comprising a triode, connections whereby said amplifier may be jointly controlled by said master oscillator and said audio frequency generator, a common source of plate potential for said triodes, means for deriving a negative potential from said source, and a keying device for controlling the application of said negative potential to the grids of said triodes.

6. In a radio transmitting system, a master oscillator comprising a triode, an amplifier comprising a triode, an audio frequency generator comprising a triode, connections whereby said amplifier may be jointly controlled by said master oscillator and said audio-frequency generator, a common source of high potential for the plates of said triodes, a resistor connected in shunt to said source, connections from the grids of said triodes to the negative end of said source, connections from the cathodes of said triodes to an intermediate point on said resistor, whereby said grids are negatively biased with respect to said cathodes, and means for establishing a shunt around that portion of the resistor which supplies said biasing potential.

7. In a radio transmitting system, a master oscillator comprising a triode, an amplifier comprising a triode, an audio-frequency generator comprising a triode having an input circuit, connections whereby said amplifier may be controlled by said master oscillator, connections whereby a grid-leak path associated with said amplifier is comprised in said input-circuit, a common source of plate potential for said triodes, means for deriving a negative potential from said source, and additional means for applying said negative potential at will to the grids of said triodes.

8. A system comprising an oscillator and an amplifier for amplifying waves from said oscillator, said oscillator and said amplifier each having a grid and a filament, means comprising two grid leak resistances connecting said oscillator and said amplifier, and a circuit comprising a switch connecting a point between said resistances to said filaments.

9. In a radio sending system, a radio-frequency source, an amplifier controlled thereby, an audio-frequency source operatively associated with said amplifier to exert an additional control thereon, and means for impressing simultaneously on both said sources a potential adapted to substantially stop the flow of all currents of said frequencies therein.

10. In a radio sending system, a radio-frequency source, an amplifier controlled thereby, an audio-frequency source operatively associated with said amplifier to exert an additional control thereon, and key-controlled means for impressing simultaneously on both said sources a potential adapted to substantially stop the flow of all currents of said frequencies therein.

11. In a radio sending system, a radio-frequency source, an amplifier controlled thereby, an audio-frequency source operatively associated with said amplifier to exert an additional control thereon and means for simultaneously blocking the flow of all signal-producing energy in both said sources and said amplifier.

12. In a radio sending system, a radio-frequency source, an amplifier controlled thereby, an audio-frequency source operatively associated with said amplifier to exert an additional control thereon, and key-controlled means for simultaneously blocking the flow of all signal-producing energy in both said sources and said amplifier.

DONALD G. LITTLE.
NATHAN C. DEFIBAUGH.